United States Patent
Quirein et al.

(10) Patent No.: US 10,209,393 B2
(45) Date of Patent: Feb. 19, 2019

(54) METHOD TO CORRECT AND PULSED NEUTRON FAN BASED INTERPRETATION FOR SHALE EFFECTS

(71) Applicant: Halliburton Energy Services, Inc., Houston, TX (US)

(72) Inventors: John Andrew Quirein, Georgetown, TX (US); Natasa Mekic, Spring, TX (US); Weijun Guo, Houston, TX (US); Daniel F. Dorffer, Houston, TX (US); Christopher S. McIlroy, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/300,509

(22) PCT Filed: Jan. 18, 2016

(86) PCT No.: PCT/US2016/013789
§ 371 (c)(1),
(2) Date: Sep. 29, 2016

(87) PCT Pub. No.: WO2016/118447
PCT Pub. Date: Jul. 28, 2016

(65) Prior Publication Data
US 2017/0315259 A1    Nov. 2, 2017

Related U.S. Application Data

(60) Provisional application No. 62/107,032, filed on Jan. 23, 2015.

(51) Int. Cl.
*G01V 5/10* (2006.01)

(52) U.S. Cl.
CPC ............... *G01V 5/102* (2013.01); *G01V 5/10* (2013.01)

(58) Field of Classification Search
CPC ..................................................... G01V 5/102
See application file for complete search history.

(56) References Cited

U.S. PATENT DOCUMENTS 7,365,308 B2 * 4/2008 Trcka ................. G01V 5/101
250/269.1
8,731,888 B2 * 5/2014 Yin ...................... G06F 17/5009
250/250

(Continued)

FOREIGN PATENT DOCUMENTS

WO    WO-2014077833 A1    5/2014
WO    WO-2016118447 A1    7/2016

OTHER PUBLICATIONS

"International Application Serial No. PCT/US2016/013789, International Search Report dated Apr. 25, 2016", 3 pgs.

(Continued)

*Primary Examiner* — Stephanie E Bloss
(74) *Attorney, Agent, or Firm* — Gilliam IP PLLC

(57) ABSTRACT

In some embodiments, a method and apparatus, as well as an article, may operate to estimate a property of an earth formation by generating at least one shale model to represent an earth formation comprised of a non-zero percentage of shale. The shale model includes two curves to represent a relationship between a porosity parameter and a pulsed neutron measurement at two different corresponding percentages of gas saturation, respectively. A matrix model representing an earth formation with 0% shale is combined with one or more shale models to create a formation model. Measured pulsed neutron data is compared with the forma- (Continued)

tion model to estimate a property of the earth formation. Additional apparatus, systems, and methods are disclosed.

18 Claims, 7 Drawing Sheets

(56) References Cited

U.S. PATENT DOCUMENTS

| | | | |
|---|---|---|---|
| 9,684,093 B2* | 6/2017 | Dusterhoft | ............... G01V 3/26 |
| 2007/0023626 A1* | 2/2007 | Riley | ..................... G01V 5/101 |
| | | | 250/269.6 |
| 2009/0287416 A1 | 11/2009 | Minh | |
| 2010/0228483 A1 | 9/2010 | Lecompte | |
| 2011/0284731 A1* | 11/2011 | Roscoe | .................. G01V 5/101 |
| | | | 250/269.3 |
| 2012/0010819 A1* | 1/2012 | Ansari | ................... G01V 5/101 |
| | | | 702/8 |
| 2012/0059587 A1* | 3/2012 | Marsh | ..................... G01V 5/06 |
| | | | 702/8 |
| 2012/0065887 A1 | 3/2012 | Liu | |
| 2012/0086060 A1 | 4/2012 | Taniguchi | |
| 2013/0234012 A1* | 9/2013 | Morris | ................... G01V 5/101 |
| | | | 250/269.6 |

OTHER PUBLICATIONS

"International Application Serial No. PCT/US2016/013789, Written Opinion dated Apr. 25, 2016", 11 pgs.

Brackenridge, Ross, et al., "Evaluation of New Multidetector Pulsed Logging Techniques to Monitor Mature North Sea Saturations", SPWLA 52nd Annual Logging Symposium, May 14-18, 2011, (2011), 1-15.

Al-Nasser, et al., "Quantifying Gas Saturation with Pulsed Neutron Logging—An Innovative Approach", SPE 166025, SPE Reservoir Characterization and Simulation Conference and Exhibition, Sep. 16-18, Abu Dhabi, UAE, Sep. 2013, pp. 1-10.

* cited by examiner

METHOD TO CORRECT AND PULSED NEUTRON FAN BASED INTERPRETATION FOR SHALE EFFECTS

CLAIM FOR PRIORITY

This application is a U.S. National Stage Filing, under 35 U.S.C. § 371 from International Application No. PCT/US2016/013789, filed on Jan. 18, 2016 and published as WO 2016/118447 A1 on Jul. 28, 2016 which application claims the benefit of U.S. Provisional Application Ser. No. 62/107,032, filed on Jan. 23, 2015, which applications and publication are incorporated herein by reference in their entireties.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole. To obtain such measurements, pulsed neutron sources are often used to measure naturally-occurring gamma radiation downhole. Pulsed neutron spectroscopy involves bombarding a formation with high-energy neutrons and measuring the spectrum of gamma rays emitted by the formation. Different nuclei in formation materials emit characteristic gamma rays, allowing for the estimation of formation constituents and properties such as porosity and oil/gas saturation.

Saturation calculation in some types of formations, such as shaly formations, using pulsed neutron instruments has always been challenging because of the issue of shale handling. For example, pulsed neutron log analysis in shaly sands is complicated because minor variations in shale volume can have a large impact on measurements. Such variations can thus significantly compromise the accuracy of pulsed neutron measurements and the corresponding analysis. Ongoing efforts are directed to improving accuracy of pulsed neutron measurements in formations that include shale.

DETAILED DESCRIPTION

To address some of the challenges described above, as well as others, systems, apparatus, and methods are described herein for improving accuracy of pulsed neutron measurements in formations that include shale.

Figure 1:
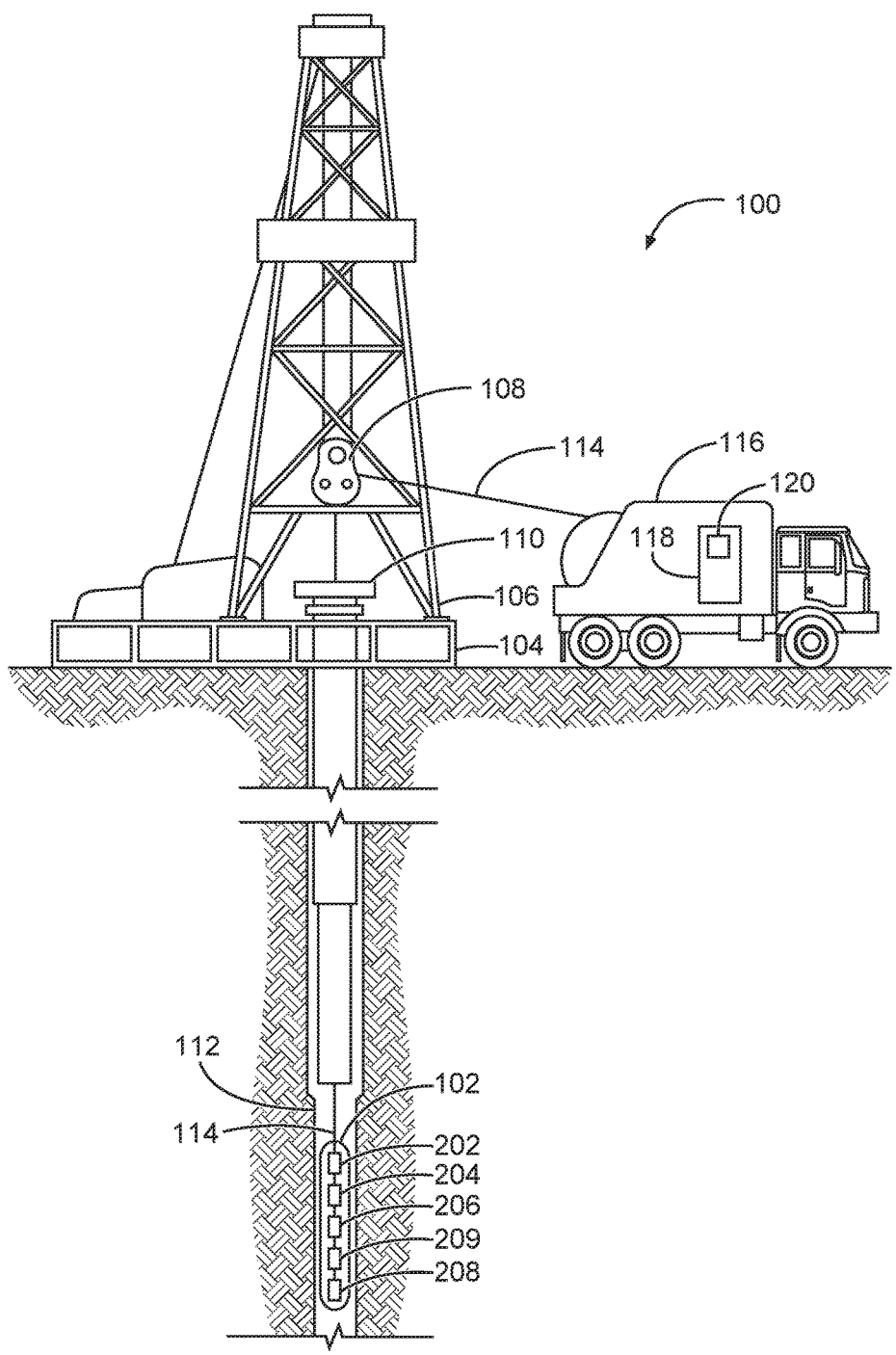
FIG. 1 is a diagram of a wireline system embodiment.

FIG. 1 is a diagram of a wireline system 100 embodiment. The wireline system 100 may comprise portions of a wireline logging tool body 102 as part of a wireline logging operation. Thus, FIG. 1 shows a well during wireline logging operations. In this case, a drilling platform 104 is equipped with a derrick 106 that supports a hoist 108.

Drilling oil and gas wells is commonly carried out using a string of drill pipes connected together so as to form a drilling string that is lowered through a rotary table 110 into a wellbore or borehole 112. Here it is assumed that the drilling string has been temporarily removed from the borehole 112 to allow a wireline logging tool body 102, such as a probe or sonde, to be lowered by wireline or logging cable 114 into the borehole 112. Typically, the wireline logging tool body 102 is lowered to the bottom of the region of interest and subsequently pulled upward at a substantially constant speed.

During the upward trip, at a series of depths instruments (e.g., a pulsed neutron instrument described in more detail below with reference to FIG. 2) included in the wireline logging tool body 102 may be used to perform measurements on the subsurface geological formations adjacent the borehole 112 (and the wireline logging tool body 102). The measurement data can be communicated to a surface logging facility 116 for storage, processing, and analysis. The logging facility 116 may be provided with electronic equipment for various types of signal processing, which may be implemented by any one or more of the components of the pulsed neutron instrument. Similar formation evaluation data may be gathered and analyzed during drilling operations (e.g., during LWD operations, and by extension, sampling while drilling).

As described herein, "formations" refer to the various features and materials that may be encountered in a subsurface environment and surround the borehole. Formations include various constituents such as sand, shale, coal, carbonates, and evaporites. The constituents include various minerals such as sandstone, quartz, potassium-feldspar, albite, calcite, dolomite, siderite, anhydrite, illite/smectite, kaolinite, glauconite, chlorite, pyrite, and others. Formations typically include dominant matrix materials in which hydrocarbon reservoirs are retained, referred to herein as "sand" or "matrix" materials. Sand materials generally include sand grain sized particles held together by silicates and/or other minerals. Examples of sand materials include one or more of sandstone, quartz, limestone and dolomite. Matrix materials may include both sand materials as well as various other minerals and materials. In addition, formations typically include shale, a sedimentary or other rock material composed of clays and other minerals, and generally having small (e.g., nanometer) pore sizes. Matrix materials, sand and shale can include various trace elements or trace minerals, such as boron, gadolinium and samarium. Trace elements, in one embodiment, include elements in the sand and/or shale materials that have a high thermal neutron capture cross-section.

In some embodiments, the pulsed neutron instrument (including electronics 202, pulsed neutron source 204, and gamma ray detectors 206, 208, 209 as described in more detail later herein) for obtaining and analyzing gamma ray field measurements in a subterranean formation through a borehole 112. The tool is suspended in the wellbore by a wireline cable 114 that connects the tool to a surface control unit (e.g., comprising a workstation 118, which can also include a display 120). The tool may be deployed in the borehole 112 on coiled tubing, jointed drill pipe, hard wired drill pipe, or any other suitable deployment technique.

Figure 2:
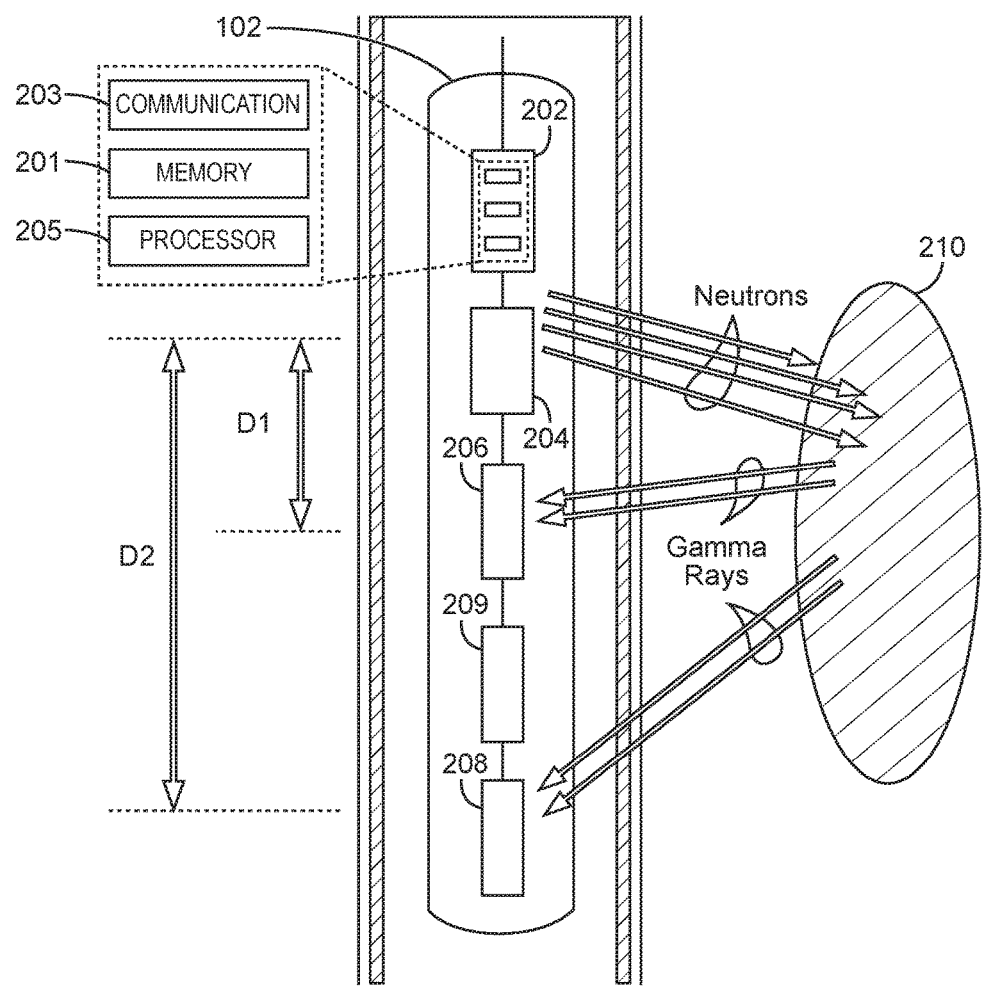
FIG. 2 is a side view of an embodiment of a downhole tool for measuring characteristics and composition of a borehole or an earth formation.

FIG. 2 is a side view of an embodiment of a pulsed neutron instrument for measuring characteristics and composition of a borehole 112 or an earth formation. The wireline logging tool body 102 encases, for example, at least one pulsed neutron source 204 and at least one gamma ray detector 206, 208, 209. In one embodiment, electronics 202 can include memory 201 for storing signals and/or data generated by the gamma ray detector 206, 208, 209.

Electronics 202 can further include communication circuitry 203 for transmitting signals and/or data generated by the gamma ray detector 206, 208, 209. The communication circuitry 203 can transmit signals using mud pulse telemetry, acoustic telemetry, wired or wireless communications, or any other type of telemetry or communications system according to a variety of communication protocols. Additionally, in some embodiments, electronics 202 can include one or more processors 205 for processing signals and/or data generated by the gamma ray detector 206, 208, 209. The number of pulsed neutron sources 204 and gamma ray detectors 206, 208, 209 is not limited. In one embodiment, at least one gamma ray detector 206, 208, 209 is configured to detect the presence of gamma rays and gamma ray attributes. Gamma ray detectors are generally capable of generating signals and/or data representative of both inelastic gamma rays and capture gamma rays.

In one embodiment, the gamma ray detectors 206, 208, 209 include a near detector 206 spaced a first distance (D1) from the neutron source 204. The near detector 206 is configured to detect gamma rays as photons emitted by the formation 210 as a result of irradiation with the neutrons emitted from the neutron source 204. Detecting photons includes counting the photons, measuring the energy of each detected photon, and/or measuring the time of detection with respect to the time of the neutron pulse. Thus, the near detector 206 can acquire data that can be used to provide a time spectrum and/or an energy spectrum.

A second detector 208 is spaced a second distance (D2) from the neutron source 204. The second detector 208 is similar to the near detector 206 with respect to detecting photons emitted by the formations 210. In one embodiment, the second distance D2 is greater than the first distance D1. The near detector 206 closest to the neutron source 204 can also be referred to as a short spaced (SS) detector 206 and the detector 208 furthest from the neutron source 204 is referred to as an extra-long spaced (XLS) detector 208. In some embodiments, at least one additional detector 209, such as a long spaced (LS) detector, is positioned between the SS detector 206 and the XLS detector 208. For example, in some embodiments, the Thermal Multigate Decay 3-Detector™ (TMD-3D) tool, available from Halliburton Company of Houston, Tex., can include a third detector such as a LS detector.

Some available systems, and some apparatuses in accordance with various embodiments, use the above-described pulsed neutron instrument (including electronics 202, pulsed neutron source 204, gamma ray detectors 206, 208, and 209) to estimate properties of an earth formation. However, embodiments are not limited and can be used in conjunction with any apparatus or configuration capable of taking pulsed neutron measurements.

A variety of parameters can be utilized to facilitate analysis of the gamma ray data. For example, calculations using the pulsed neutron data can generate a saturation gate (SATG) parameter, wherein SATG is the ratio between inelastic counts and slow capture counts from a single gamma detector (for example, one of the SS detector 206, XLS detector 208 or LS detector 209). However, embodiments are not limited to SATG parameters.

The SATG parameter was originally created for tight gas sandstone formations. As the usage of pulsed-neutron tools has expanded into new areas, formations, completions, and environments, it was observed that the SATG response was affected by other mineralogy such as shale. Algorithms that did not correct the SATG response for shale often generated an error in the predicted water saturation.

Embodiments provide a method for making shale corrections to any pulsed-neutron measurements used in conjunction with a total porosity measurement to construct a fan (described in more detail below) for predicting water saturation. Methods in accordance with various embodiments apply to a family of pulsed neutron measurements such as inelastic count rate ratios and/or capture count ratios. In contrast, some available methods use a combination of shale fans and clean sand fans to apply a shale correction. However, available approaches disregard the fact that shale contains bound water and therefore shale cannot generally be totally saturated with hydrocarbon.

Figure 3:
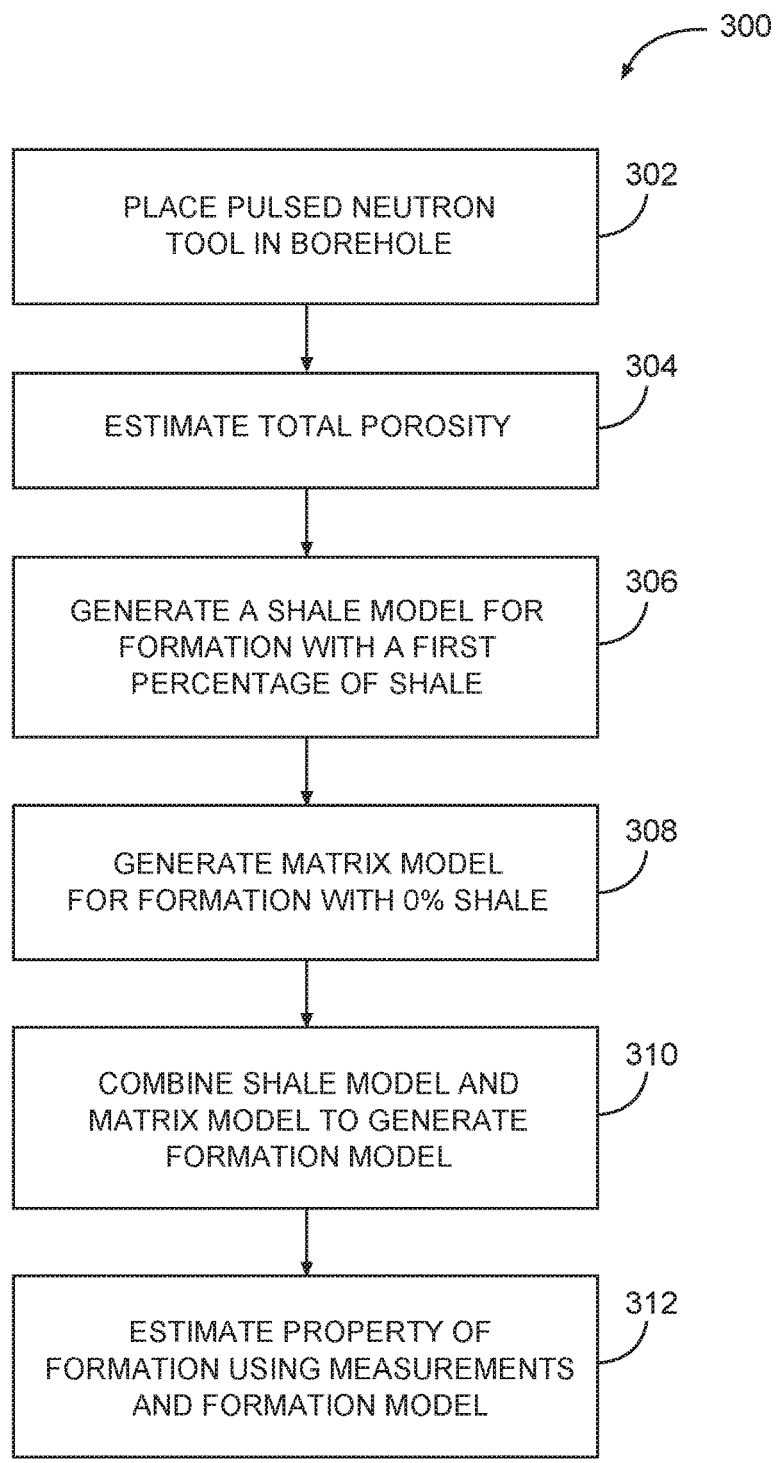
FIG. 3 is a flow chart of an example method for estimating a property of an earth formation in accordance with some embodiments.

FIG. 3 is a flow chart of an example method 300 for estimating a property of an earth formation in accordance with some embodiments. The method 300 may be used in conjunction with any apparatus or configuration capable of taking pulsed neutron measurements. While the method 300 can include the operations described occurring in the order described, embodiments are not limited thereto, and certain operations can be omitted or added and the order of the operations can be changed.

In operation 302, the wireline logging tool body 102 and pulsed neutron tool (for example pulsed neutron tool (including electronics 202, pulsed neutron source 204, gamma ray detectors 206, 208, 209) is disposed in the borehole 112, the pulsed neutron tool is actuated to generate pulsed neutron data, and one or more measurements are taken. The borehole 112 may be a cased borehole or an open borehole. Measurements are taken by activating the neutron source 204 and detecting resultant gamma ray photons at one or more detectors 206, 208, 209 and other detectors (not shown in FIGS. 1-2). In some embodiments, one or more measurements are taken for each of a plurality of borehole depths.

In some embodiments, the taking of measurements from the pulsed neutron tool is recorded in relation to the depth and/or position of the wireline logging tool body 102, which is referred to as "logging," and a record of such measurements is referred to as a "log." Examples of logging processes that can be performed by the system 100 and in conjunction with the methods described herein include measurement-while-drilling (MWD) and logging-while-drilling (LWD) processes. Additional examples of logging processes include logging measurements after drilling, wireline logging, pipe-conveyed logging operations, drop shot logging and memory logging. The data retrieved during these processes may be transmitted to the surface, and may also be stored with the downhole tool for later retrieval.

In operation 304, a processor (e.g., processor 205 or a processor of the surface system) estimates the total porosity of the formation at each data point. Porosity can be estimated by any suitable method, including methods using open hole logs and neutron based measurements.

In operation 306, a processor 205 generates at least one reference shale model of the shale region of the formation (e.g., a "shale model," a "first shale model," a "reference shale fan" or a "first reference shale fan"). In one embodiment, the reference shale model is generated by generating and/or selecting a number of hypothetical shale models. Each of the hypothetical shale models includes varying mixes or concentrations of constituents such as sand minerals, clay minerals and trace elements. Measurement data is then compared to each of the hypothetical shale models to determine the most appropriate or closest shale model, which will be used as the reference shale model for additional operations. However, as will be described in more detail below with reference to FIG. 6, any number of reference shale models can be constructed to enhance or improve accuracy of results in accordance with some embodiments.

In one embodiment, the concentration of trace elements in the reference shale model is estimated based on sigma values calculated from the measurement data. In some embodiments, the reference shale model represents an earth formation comprised of a non-zero percentage of shale. In some embodiments, the reference shale model corresponds to a mixture of 50% shale and 50% sand constructed from Monte Carlo simulation (e.g., "experimental data") assuming the shale consists of silt and clay of known chemical composition and clay porosity. Monte Carlo methods (or Monte Carlo experiments) are a broad class of computational algorithms that rely on repeated random sampling to obtain the distribution of an unknown probabilistic entity.

In operation 308, the processor 205 generates a model of the sand or matrix region of the formation ("matrix model"). The matrix model may represent an earth formation comprised of about 0% shale. In one embodiment, the matrix model is generated by generating and/or selecting a number of hypothetical matrix models. The matrix model is selected based on comparison of a number of hypothetical matrix models (including varying amounts of sand and/or other matrix materials and trace elements) with measurement data.

In operation 310, the processor 205 generates a model of the formation ("formation model"). The selected matrix and shale models (or plurality of shale models) are mixed or otherwise combined to yield the formation model, as per the relative volumes of matrix and shale. This combination is described in more detail with reference to FIG. 6.

In some embodiments, the matrix, shale and formation models are generated using the total porosity measurements of the formation of operation 304. Each of the matrix, shale and formation models involves both total porosity and SATG in some embodiments. The models are built based on, for example, information regarding the borehole and downhole tool configurations, and estimations of the formation make-up including the matrix and shale, as well as trace elements.

The calculations used to construct the models can be performed via deterministic methods (e.g., the Boltzmann transport equation) or simulations such as Monte Carlo based modeling. The Boltzmann transport equation (BTE) is known to those of ordinary skill in the art to describe the statistical behavior of a thermodynamic system not in thermodynamic equilibrium. In one embodiment, the models are Monte Carlo numerical models designed to predict expected measurement values. The models may include geometrical descriptions of tool and completion geometry, borehole fluids, and formation minerals and fluids.

In operation 312, the processor or other element of the electronics 202 uses the formation model to estimate various properties of the formation in conjunction with the measured data. For example, the processor 205 may compare the measured data (e.g., measured pulsed neutron data) versus expected data generated as part of the formation model to estimate properties of the formation. For example, using the formation model and total porosity, as well as the pulsed neutron data, the processor or other element of the electronics 202 can estimate water, oil and/or gas saturation.

Figure 4:
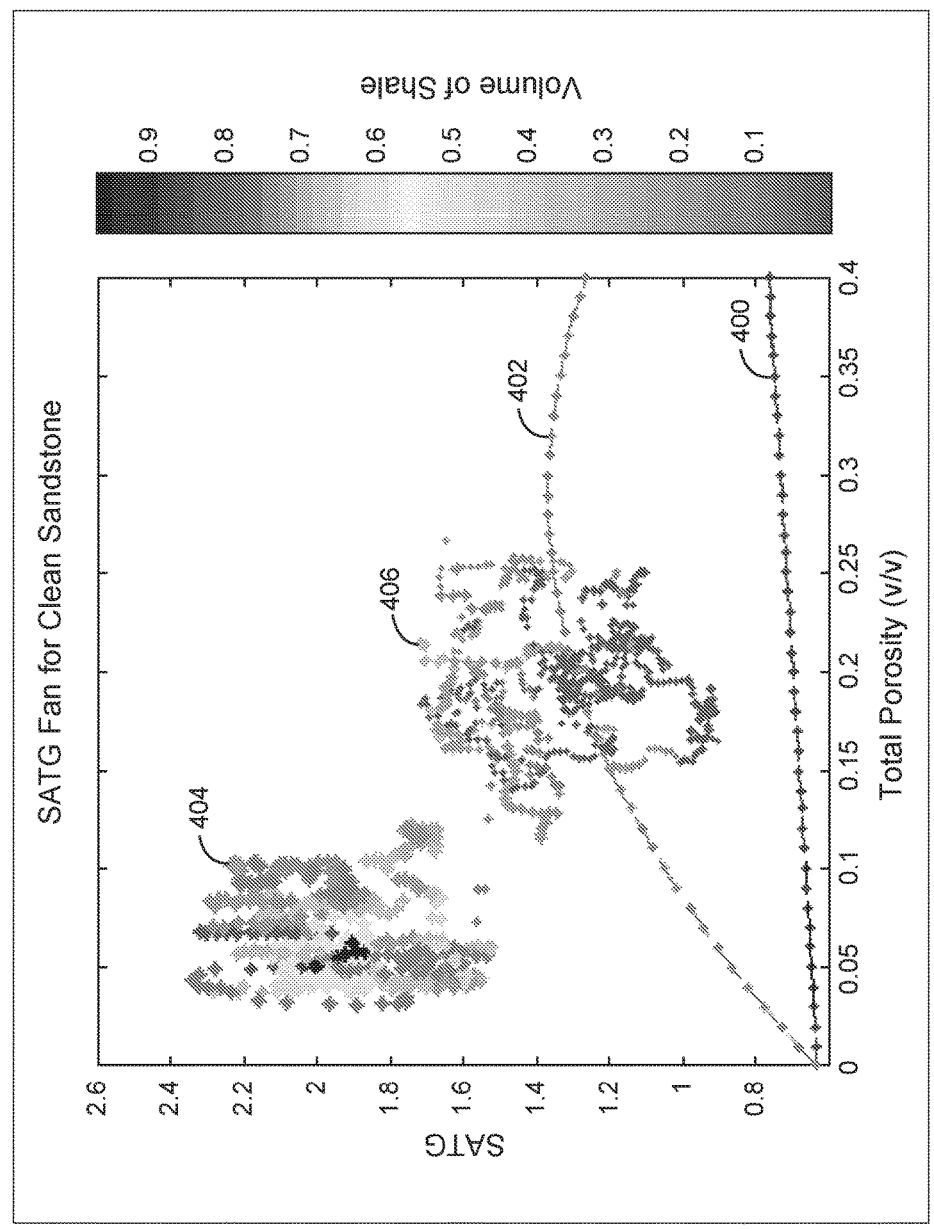
FIG. 4 is a first example model used in some available systems for comparison with models generated in accordance with some embodiments.

FIG. 4 is a first example model used in some available systems for comparison with models generated in accordance with some embodiments. FIG. 4 illustrates an SATG plot relative to total porosity. FIG. 4 below illustrates the problem with the current methodology when the formation is a mixture of sand and shale. The lower curve 400 corresponds to the SATG response for a clean sand (no shale) and porosity filled with gas. The upper curve 402 corresponds to the SATG response for a clean sand and porosity filled with water. These two curves form a fan in which the water saturation increases from bottom to top, but any samples lying above the fan are assumed to be at 100% water saturation.

The size of the filled dots corresponds to the volume of shale from an interpretation, wherein the dots are measured data points, according to the gray scale on the right side of FIG. 4. It will be appreciated upon examination of FIG. 4 that the SATG response increases with the amount of shale. As shown, the measured data represented by the dots does not correlate well (e.g., does not closely correlate) with the model represented by the upper curve 402 and the lower curve 400. For example, the dots 404 include more shale than, for example, the dots 406. As the shale dots 404 are not within the fan created by curves 400 and 402, it can be appreciated that it will be difficult to predict water saturation for formations including shale using available systems that make use of only one fan.

Figure 5:
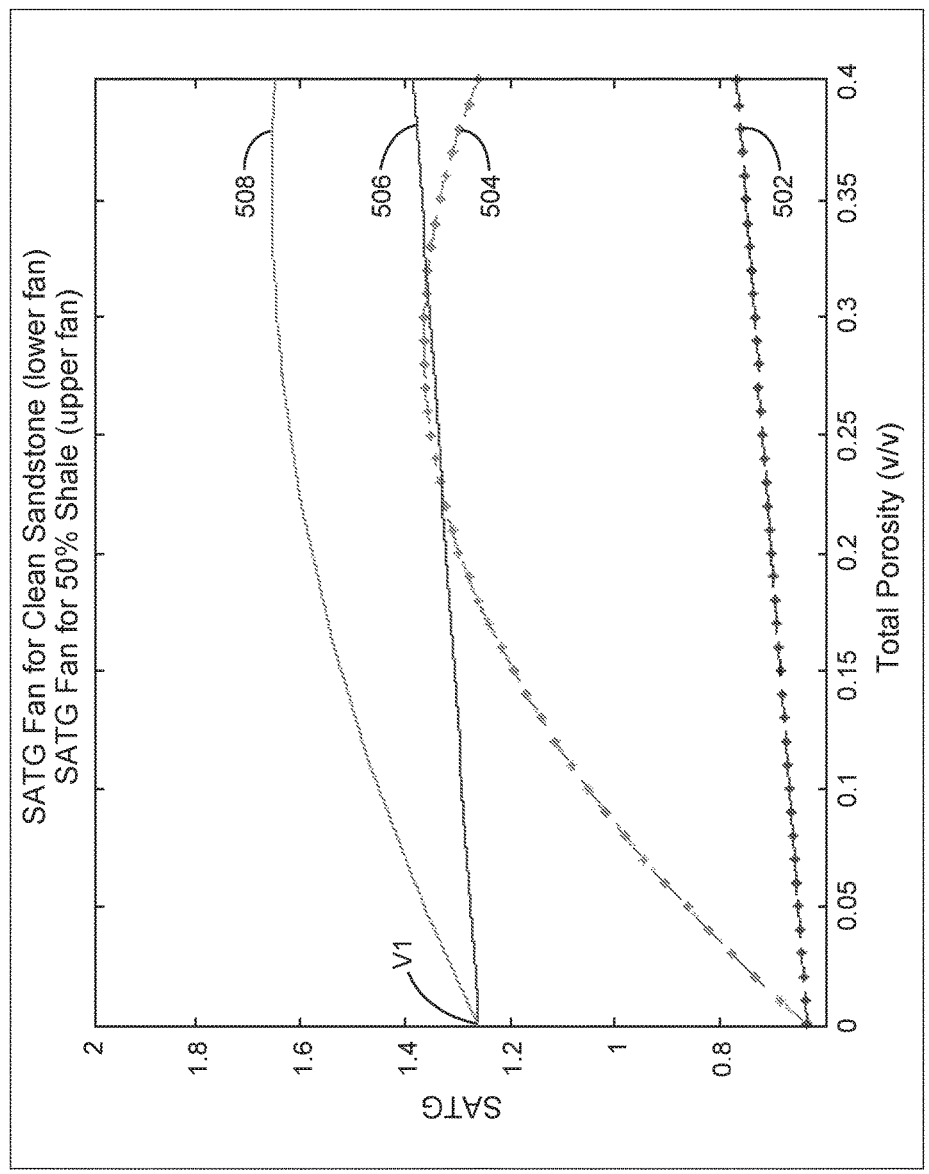
FIG. 5 is a second example model used in some available systems for comparison with models generated in accordance with some embodiments.

FIG. 5 is a second example model in accordance with some available systems for comparison with models generated in accordance with some embodiments. Algorithms making use of a model in accordance with FIG. 5 use an additional fan (e.g., a shale fan) corresponding to 100% shale consisting of 50% quartz and 50% dry clay. These algorithms allow porosity to vary and construct a fan lower curve corresponding to 100% gas saturation and a fan upper curve corresponding to 100% water saturation.

In FIG. 5, the lower fan comprised of curves 502 and 504 represents clean sandstone and the upper fan (e.g., "shale fan") comprised of curves 506 and 508 represents a formation consisting of 50% shale and 50% sandstone. On comparison with FIG. 4, it can be appreciated that the shale fan comprised of curves 506 and 508 can account for at least some shale interpretations. However, because the upper 50% shale fan (curves 506 and 508) has a vertex V1 at 0% total porosity, this shale fan allows all the existing porosity to be saturated with gas, which disregards the fact that shale generally has some clay bound water that cannot be saturated with gas.

Embodiments can account for at least this clay bound water, to provide greater accuracy in predicting water saturation, which in turn can lead to more accurate estimation of formation properties that include shale with clay bound water. Embodiments construct an algorithm such that for any volume of shale an appropriate fan is constructed, and for the corresponding values of SATG (or other pulsed neutron measurement) and total porosity water saturation is computed and applied to the porosity to compute a volume of water and hydrocarbon. The results of applying the algorithm are presented in FIG. 6.

Figure 6:
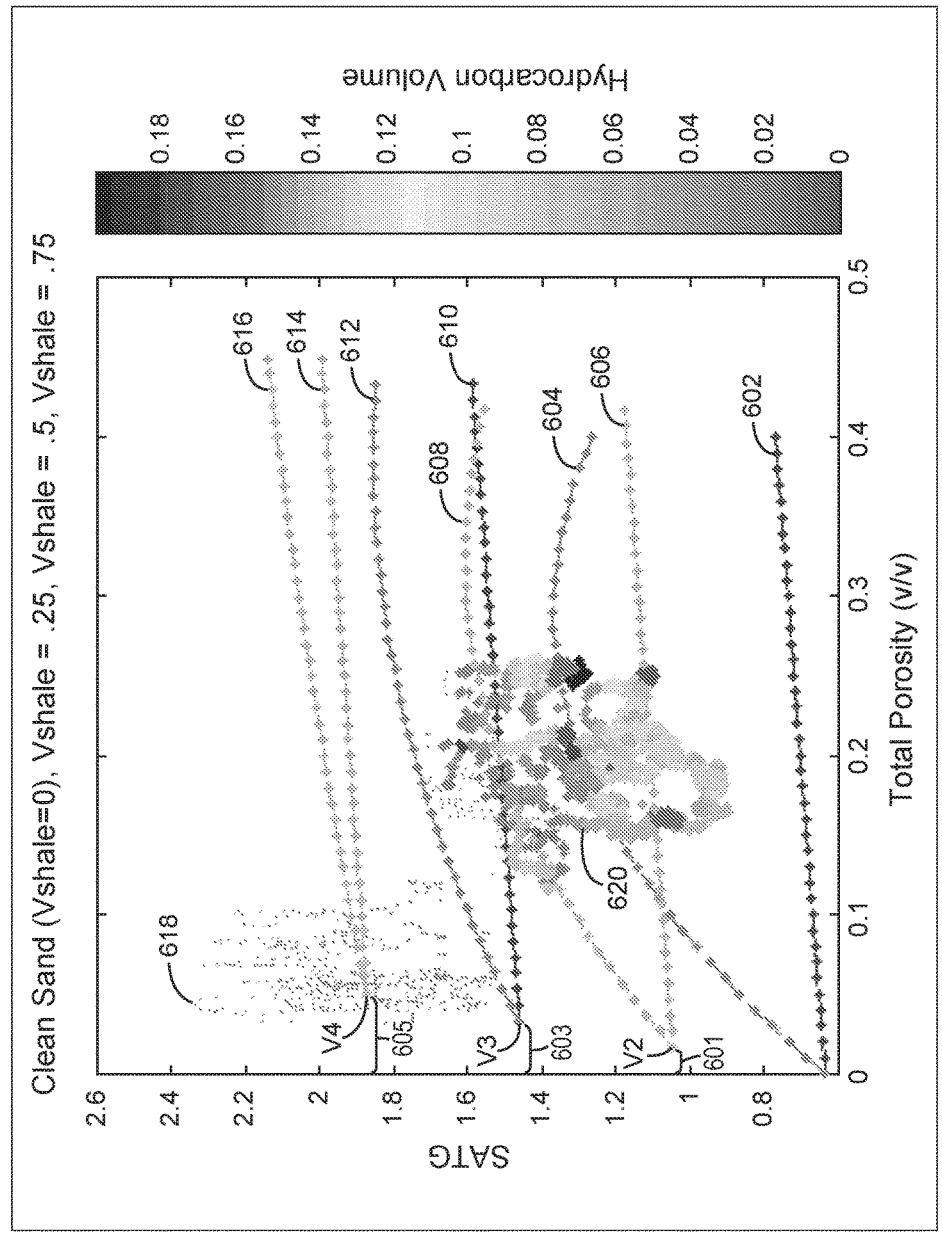
FIG. 6 is an exemplary plot illustrating fans and the volume of hydrocarbon resulting from applying an appropriate fan at every depth based on the shale composition and volume in accordance with some embodiments.

FIG. 6 is an exemplary plot illustrating fans and the volume of hydrocarbon resulting from applying an appropriate fan at every depth based on the shale composition and volume in accordance with some embodiments. Common shale is usually a mixture of clays and silt (small grain size quartz particles) and the chemical composition of shale will vary from basin to basin. Illustrated embodiments assume a shale that is comprised of a 50-50 mixture of dry clay, $V_{clay}$, and silt, $V_{silt}$. However, embodiments are not limited to any particular mixture of components in shale. Further, illustrated embodiments assume a formation which is a 50-50 mixture of sand and dry shale. The clay $V_{clay}$ is assumed for illustrative purposes to be illite and dry and associated with it is an amount of clay bound water ($V_{CBW}$).

FIG. 6 presents four fans. A first fan (e.g., "matrix fan") includes curves 602 and 604. A second fan (e.g., a first formation fan) includes curves 606 and 608. A third fan (reference shale fan) includes curves 610 and 612, and a fourth fan (e.g., a second formation fan) includes curves 614 and 616. In some embodiments, the fans are generated based on Monte Carlo modeling or other modeling as described above with reference to FIGS. 4 and 5. From bottom to top, the fans correspond to 0, 25, 50, and 75% shale. However, embodiments are not limited to four fans, or to any particular shale percentage or set of percentages. The vertices V2, V3 and V4 of fans is seen to increase from bottom to top, as the clay bound water increases with increasing amounts of shale.

As was described above with reference to operation 306 (FIG. 3), at least one reference shale model is constructed comprised of a first curve and a second curve representative of a relationship between a porosity parameter (e.g., total porosity along the x-axis in FIG. 6) and a pulsed neutron measurement parameter (e.g., SATG along the y-axis in FIG. 6, although embodiments are not limited to SATG) at two different corresponding percentages of gas saturation, respectively. The first curve and the second curve intersect at a vertex V3 in the reference shale fan. It will also be appreciated, upon comparison of FIG. 4 and FIG. 6, that the reference shale fan encompasses dots (e.g., "interpretations") that line up with a 50% volume of shale, referenced against the scale to the right of FIG. 4. The vertex is shifted by a non-zero value 603 relative to a 0 value for the porosity parameter. The non-zero value 603 corresponds to an amount of shale porosity in the earth formation modeled by the reference shale model. For example, the vertex V3 is located at the value of the pulsed neutron measurement (e.g., SATG) and total porosity for 50% shale. Shifting the vertex by this value, therefore, adjusts algorithms in accordance to some embodiments for the possible presence of clay-bound water in shale in a formation. It is further noted that the vertex V1 in FIG. 5, generated according to algorithms in some available systems, is not shifted relative to a 0 value for the porosity parameter and therefore algorithms in accordance with some embodiments do not adjust for the possible presence of clay-bound water in shale in a formation and these algorithms produce inaccurate results in some environments for at least that reason.

While only one reference fan (defined by curves 610 and 612) is shown in FIG. 6, embodiments are not limited to one reference shale fan, and in some embodiments two or more reference shale fans may be generated. As an example, in some embodiments, a second reference shale fan (e.g., "a second reference shale model") is generated corresponding to 25% shale. For $V_{shale}$ less than 25%, the processor 205 will use this second reference shale fan and the matrix fan to compute the formation model (e.g., the formation fan) in operation 310. For $V_{shale}$ between 25% and 50%, the processor 205 can use both the first reference shale fan and the second reference shale fan in combination with the matrix fan to construct the formation model (e.g., the formation fan). Similarly, the processor 205 can construct and use any other reference shale fans using a similar process as that described above, for combination with the matrix fan at various $V_{shale}$ values.

The matrix model (e.g., "matrix fan"), described above with reference to operation 308 (FIG. 3) can include the fan represented by curves 602 and 604. As will be appreciated upon examination of FIG. 6, the curves 602 and 604 intersect at a vertex at a value of 0 for the porosity parameter.

With reference to operation 310 (FIG. 3), at every depth the reference shale fan or fans and the matrix fan are used to generate a formation fan with the vertex moving away from the origin in proportion to the volume of shale. For example, algorithms in accordance with embodiments generate a formation fan defined by curves 606 and 608 with a vertex V2 shifted by value 601. Additionally, another formation fan defined by curves 614 and 616 is constructed, with a vertex V4 shifted by a value 605. The combination of the reference shale fan, the matrix fan and any additional reference fans, produces a formation model briefly mentioned above with respect to operation 310.

As can be appreciated upon inspection of FIG. 6, hydrocarbon is now detected above the lower 100% clean sand fan illustrating that algorithms in accordance with various embodiments have accomplished correction for the presence of shale. According to the gray scale on the right side of FIG. 6, dots representing more hydrocarbon, such as dots 620, fall within fans. At least those hydrocarbon areas would not have been detected by some available algorithms described earlier herein with reference to FIGS. 4 and 5. Other dots 618 which have a very low level of hydrocarbon (or not any hydrocarbon) (as represented with reference to the gray scale on the right of FIG. 6) fall outside of the fans and would not be detected or predicted.

Figure 7:
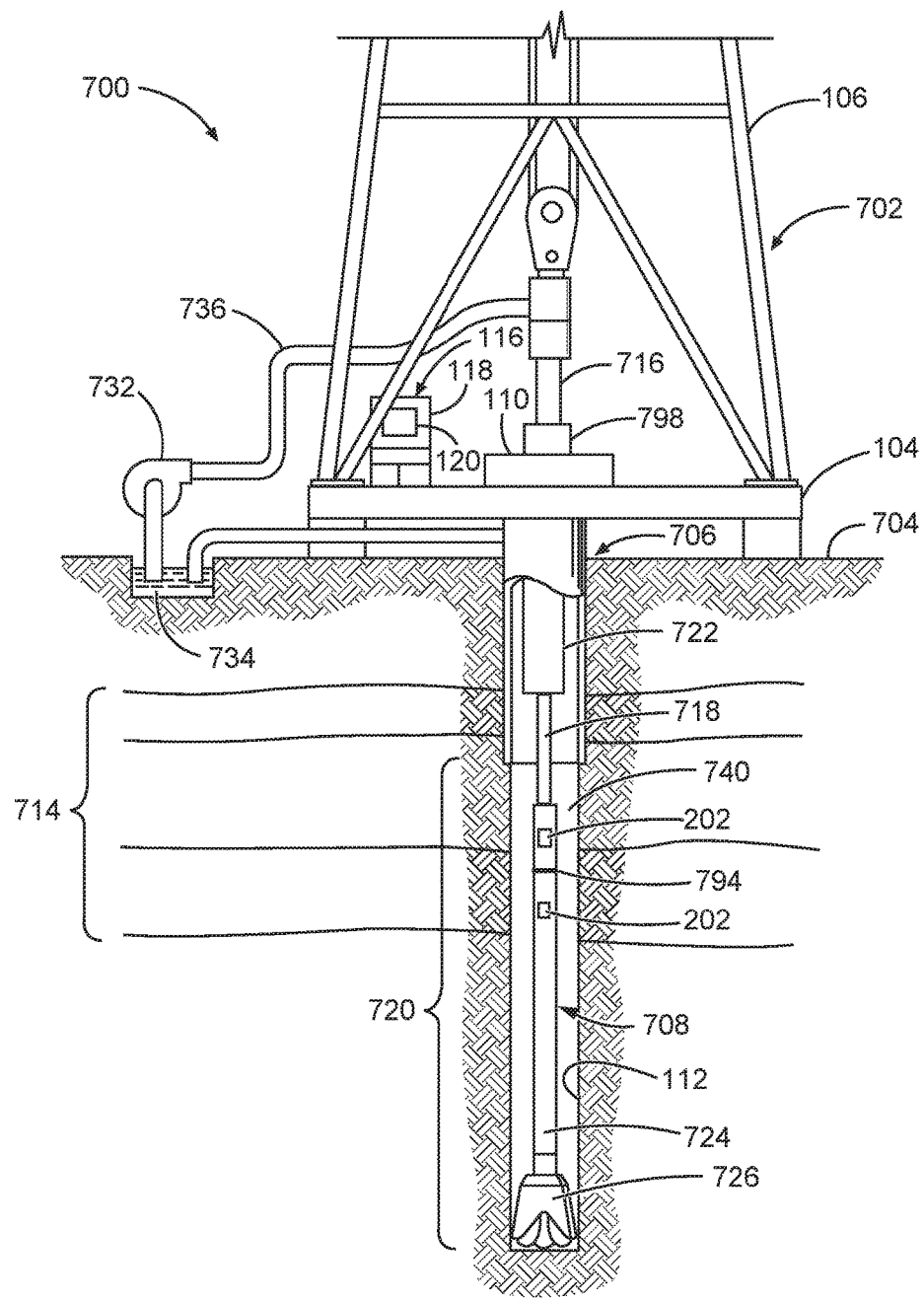
FIG. 7 is a diagram of a drilling rig system embodiment.

In addition to wireline embodiments, example embodiments can also be implemented in drilling rig systems. FIG. 7 illustrates a drilling rig system 700 embodiment. The system 700 can include a downhole tool 724 as part of a downhole drilling operation.

Referring to FIG. 7, it can be seen how a system 700 may also form a portion of a drilling rig 702 located at the surface 704 of a well 706. The drilling rig 702 may provide support for a drill string 708. The drill string 708 may operate to penetrate the rotary table 110 for drilling the borehole 112 through the subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, a downhole tool 724, and a drill bit 726. The drill bit 726 may operate to create the borehole 112 by penetrating the surface 704 and the subsurface formations 714. The downhole tool 724 may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 110. Although not shown, in addition to, or alternatively, the bottom hole assembly 720 may also be rotated by a motor (e.g., a mud motor) that is located downhole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 112. The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation cuttings created by operating the drill bit 726.

Thus, it may be seen that in some embodiments, the systems 100, 700 may include a drill collar 722, a downhole tool 724, and/or a wireline logging tool body 102 to house one or more pulsed neutron instruments, similar to or identical to the pulsed neutron instrument described above and illustrated in FIGS. 1 and 2.

Thus, for the purposes of this document, the term "housing" may include any one or more of a drill collar 722, a downhole tool 724, or a wireline logging tool body 102 (all having an outer wall, to enclose or attach to magnetometers, sensors, fluid sampling devices, pressure measurement devices, transmitters, receivers, acquisition and processing logic, and data acquisition systems). The tool 724 may comprise a downhole tool, such as an LWD tool or MWD tool. The wireline logging tool body 102 may comprise a wireline logging tool, including a probe or sonde, for example, coupled to a logging cable 114. Many embodiments may thus be realized.

Thus, a system 100, 700 may comprise a downhole tool body, such as a wireline logging tool body 102 or a downhole tool 724 (e.g., an LWD or MWD tool body), and one or more pulsed neutron instruments attached to the tool body, the pulsed neutron instrument to be constructed and operated as described previously.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 201 (FIG. 2) in the form of read only memory (ROM), random access memory (RAM), a magnetic disk storage device, an optical storage device, a flash memory, and other electronic, magnetic, or optical memory devices, including combinations thereof.

The physical structure of such instructions may be operated on by one or more processors such as, for example, the processor 205 (FIG. 2). Executing these physical structures can cause the machine to perform operations according to methods described herein. The instructions can include instructions to cause the processor 205 to store associated data or other data in the memory 201.

The wireline logging tool body 102 (FIG. 1), in addition to including a pulsed neutron tool, may include or otherwise be utilized in conjunction with any number of additional measurement tools such as nuclear magnetic resonance (NMR) tools, nuclear quadrupole resonance (NQR) tools, resistivity tools, seismic tools, porosity sensors and others. In one embodiment, the wireline logging tool body 102 is equipped with transmission equipment to communicate ultimately to a surface processing unit of a surface logging facility 116 (FIG. 1). Such transmission equipment may take any desired form, and different transmission media and methods may be used. Examples of connections include wired, fiber optic, wireless connections and memory based systems.

Any of the above components, for example the pulsed neutron instruments, etc., may all be characterized as "modules" herein. Such modules may include hardware circuitry, and/or a processor and/or memory circuits, software program modules and objects, and/or firmware, and combinations thereof, as desired by the architect of the pulsed neutron instrument, electronics 202, processor 205 and systems 100, 700 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of pulsed neutron instruments and components thereof, and of systems 100, 700 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Some embodiments include a number of methods.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

In summary, using the apparatus, systems, and methods disclosed herein may provide more accurate measurements and identification of hydrocarbon-bearing formations by adjusting for the effects of shale on pulsed neutron measurements. These advantages can significantly enhance the value of the services provided by an operation/exploration company, while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Various examples include:

Example 1 is a method of estimating at least one property of an earth formation, the method comprising: generating a shale model to represent an earth formation comprised of a first non-zero percentage of shale, the shale model including a first curve and a second curve representative of a relationship between a porosity parameter and a pulsed neutron measurement parameter at two different corresponding percentages of gas saturation, respectively; generating a matrix model to represent an earth formation comprised of 0% shale, the matrix model including a first curve and a second curve representative of a relationship between the porosity parameter and the pulsed neutron measurement parameter at two different corresponding percentages of gas saturation; combining the shale model and the matrix model to generate a formation model corresponding to a second percentage of shale different from the first non-zero percentage of shale, the formation model including a first curve and a second curve intersecting at a vertex shifted by a non-zero value, relative to a 0 value for the porosity parameter, the non-zero value corresponding to an amount of shale porosity in the earth formation modeled by the formation model; and comparing measured pulsed neutron data with the formation model to estimate at least one property of the earth formation.

In Example 2, the subject matter of Example 1 further includes disposing a pulsed neutron tool in a borehole in the earth formation; and actuating the pulsed neutron tool to generate pulsed neutron data.

In Example 3, the subject matter of Example 2 further includes wherein the borehole is a cased borehole.

In Example 4, the subject matter of any one of Examples 1 to 3 further includes wherein the porosity parameter includes a total porosity parameter and wherein the pulsed neutron measurement parameter includes an SATG parameter.

In Example 5, the subject matter of any of Examples 1 to 3 further includes wherein the first curve of each of the shale model, the matrix model, and the formation model corresponds to 100% gas saturation and wherein the second curve of each of the shale model, the formation model and the matrix model corresponds to 100% water saturation.

In Example 6, the subject matter of any of Examples 1 to 3 further includes generating the non-zero value based on a Monte Carlo estimation algorithm using experimental measurement data for the earth formation.

In Example 7, the subject matter of any of Examples 1 to 3 further includes wherein the at least one property is at least one of a hydrocarbon saturation and a water saturation.

In Example 8, the subject matter of any of Examples 1 to 3 further includes wherein generating the matrix model includes generating a plurality of hypothetical matrix models, comparing the plurality of hypothetical matrix models to the measured pulsed neutron data and selecting a hypothetical matrix model that most closely correlates with the measured pulsed neutron data.

In Example 9, the subject matter of Example 8 further includes wherein each of the plurality of hypothetical matrix models includes selected concentrations of sand material and at least one trace mineral.

Example 10 is an apparatus for estimating at least one property of an earth formation, the apparatus comprising: a neutron source at least partially encased in a tool body to irradiate the earth formation with neutrons; a detector disposed with at the tool body to measure gamma rays emitted by the earth formation and to generate gamma ray measurement data; and processor in communication with the detector to receive the gamma ray measurement data, the processor configured to generate a shale model to represent the earth formation comprised of a first non-zero percentage of shale, and the shale model including a first curve and a second curve representative of a relationship between a porosity parameter and a pulsed neutron measurement parameter at two different corresponding percentages of gas saturation; generate a matrix model to represent the earth formation comprised of 0% shale, the matrix model including a first curve and a second curve representative of a relationship between the porosity parameter and the pulsed neutron measurement parameter at two different corresponding percentages of gas saturation; combine the shale model and the matrix model to generate a formation model corresponding to a second percentage of shale different from the first non-zero percentage of shale, the formation model including a first curve and a second curve intersecting at a vertex shifted by a non-zero value relative to a 0 value for the porosity parameter, the non-zero value corresponding to an amount of shale porosity in the earth formation modeled by the formation model; and compare measured pulsed neutron data with the formation model to estimate at least one property of the earth formation.

In Example 11, the subject matter of Example 10 further includes wherein the porosity parameter includes a total porosity parameter and wherein the pulsed neutron measurement parameter includes an SATG parameter.

In Example 12, the subject matter of Example 10 further includes wherein the first curve of each of the shale model, the matrix model, and the formation model corresponds to 100% gas saturation and wherein the second curve of each of the shale model, the formation model and the matrix model corresponds to 100% water saturation.

In Example 13, the subject matter of Example 10 further includes wherein the processor is further configured to generate the non-zero value based on a Monte Carlo estimation algorithm using experimental measurement data for the earth formation.

In Example 14, the subject matter of Example 13 further includes wherein the processor is further configured to generate another non-zero value based on the non-zero value and further based on a comparison between the percentage of shale in the earth formation modeled by the shale model and the formation model.

In Example 15, the subject matter of Example 10 further includes wherein the at least one property is one of a hydrocarbon saturation and a water saturation.

In Example 16, the subject matter of Example 10 further includes wherein the processor is further configured to generate the matrix model by generating a plurality of hypothetical matrix models, comparing the plurality of hypothetical matrix models to the measured pulsed neutron data and selecting a hypothetical matrix model that most closely correlates with the measured pulsed neutron data.

Example 17 is a machine-readable storage device having instructions stored thereon, which, when executed by one or more processors of a machine, cause the machine to perform operations, the operations comprising: generating a shale model to represent an earth formation comprised of a first non-zero percentage of shale, and the shale model including a first curve and a second curve representative of a relationship between a porosity parameter and a pulsed neutron measurement parameter at two different corresponding percentages of gas saturation, respectively; generating a matrix model to represent an earth formation comprised of 0% shale, the matrix model including a first curve and a second curve representative of a relationship between the porosity parameter and the pulsed neutron measurement parameter at two different corresponding percentages of gas saturation; combining the shale model and the matrix model to generate a formation model corresponding to a second percentage of shale different from the first non-zero percentage of shale, the formation model including a first curve and a second curve intersecting at a vertex shifted by a non-zero value, relative to a 0 value for the porosity parameter, the non-zero value corresponding to an amount of shale porosity in the earth formation modeled by the formation model; and comparing measured pulsed neutron data with the formation model to estimate at least one property of the earth formation.

In Example 18, the subject matter of Example 17 further includes wherein the porosity parameter includes a total porosity parameter and wherein the pulsed neutron measurement parameter includes an SATG parameter.

In Example 19, the subject matter of Example 17 further includes generating the non-zero value based on a Monte Carlo estimation algorithm using experimental measurement data for the earth formation.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method of estimating at least one property of a formation, the method comprising:
    irradiating, by a neutron source within a downhole tool, a formation with neutron radiation;
    measuring, by at least two gamma detectors that are longitudinally separated within and along the length of the downhole tool, gamma radiation induced in the formation by the neutron radiation;
    determining a saturation gate parameter value based on a ratio between an inelastic count value and slow capture count value that are both measured by a single one of the at least two gamma detectors;
    generating a shale model to represent an earth formation comprised of a first non-zero percentage of shale, the shale model including a first curve and a second curve representative of a relationship between a porosity parameter and the saturation gate parameter at two different corresponding percentages of gas saturation, respectively;
    generating a matrix model to represent an earth formation comprised of 0% shale, the matrix model including a first curve and a second curve representative of a relationship between the porosity parameter and the saturation gate parameter at two different corresponding percentages of gas saturation;
    combining the shale model and the matrix model to generate a formation model corresponding to a second percentage of shale different from the first non-zero percentage of shale, the formation model including a first curve and a second curve intersecting at a vertex shifted by a non-zero value, relative to a 0 value for the porosity parameter, the non-zero value corresponding to an amount of shale porosity in the earth formation modeled by the formation model; and
    comparing the measured gamma radiation responses with the formation model to estimate at least one property of the earth formation.

2. The method of claim 1, further comprising
    disposing a pulsed neutron tool in a borehole in the earth formation; and
    actuating the neutron source to generate pulsed neutron radiation.

3. The method of claim 2, wherein the borehole is a cased borehole.

4. The method of claim 1, wherein the porosity parameter includes a total porosity parameter.

5. The method of claim 1, wherein the first curve of each of the shale model, the matrix model, and the formation model corresponds to 100% gas saturation and wherein the second curve of each of the shale model, the formation model and the matrix model corresponds to 100% water saturation.

6. The method of claim 1, further comprising generating the non-zero value based on a Monte Carlo estimation algorithm using experimental measurement data for the earth formation.

7. The method of claim 1, wherein the at least one property is at least one of a hydrocarbon saturation and a water saturation.

8. The method of claim 1, wherein generating the matrix model includes generating a plurality of hypothetical matrix models, comparing the plurality of hypothetical matrix models to the measured pulsed neutron data and selecting a hypothetical matrix model that most closely correlates with measured pulsed neutron data.

9. The method of claim 8, wherein each of the plurality of hypothetical matrix models includes selected concentrations of sand material and at least one trace mineral.

10. The method of claim 1, wherein the generated shale model represents an earth formation comprised of a first non-zero percentage of shale that excludes sand components.

11. An apparatus for estimating at least one property of a formation, the apparatus comprising:
   a neutron source at least partially encased in a tool body and configured to irradiate the formation with neutron radiation;
   at least two gamma detectors that are longitudinally separated within and along the length of the tool body, said at least two gamma detectors configured to measure gamma radiation induced in the formation by the neutron radiation; and
   a processor in communication with the detector to receive the gamma ray measurement data, the processor configured to
   determine a saturation gate parameter value based on a ratio between an inelastic count value and slow capture count value that are both measured by a single one of the at least two gamma detectors;
   generate a shale model to represent the earth formation comprised of a first non-zero percentage of shale, and the shale model including a first curve and a second curve representative of a relationship between a porosity parameter and a the saturation gate parameter at two different corresponding percentages of gas saturation;
   generate a matrix model to represent the earth formation comprised of 0% shale, the matrix model including a first curve and a second curve representative of a relationship between the porosity parameter and the saturation gate parameter at two different corresponding percentages of gas saturation;
   combine the shale model and the matrix model to generate a formation model corresponding to a second percentage of shale different from the first non-zero percentage of shale, the formation model including a first curve and a second curve intersecting at a vertex shifted by a non-zero value relative to a 0 value for the porosity parameter, the non-zero value corresponding to an amount of shale porosity in the earth formation modeled by the formation model; and
   compare the measured gamma radiation with the formation model to estimate at least one property of the earth formation.

12. The apparatus of claim 11, wherein the porosity parameter includes a total porosity parameter.

13. The apparatus of claim 11, wherein the first curve of each of the shale model, the matrix model, and the formation model corresponds to 100% gas saturation and wherein the second curve of each of the shale model, the formation model and the matrix model corresponds to 100% water saturation.

14. The apparatus of claim 11, wherein the processor is further configured to generate the non-zero value based on a Monte Carlo estimation algorithm using experimental measurement data for the earth formation.

15. The apparatus of claim 14, wherein the processor is further configured to generate another non-zero value based on the non-zero value and further based on a comparison between the percentage of shale in the earth formation modeled by the shale model and the formation model.

16. The apparatus of claim 11, wherein the at least one property is one of a hydrocarbon saturation and a water saturation.

17. The apparatus of claim 11, wherein the processor is further configured to generate the matrix model by generating a plurality of hypothetical matrix models, comparing the plurality of hypothetical matrix models to the measured pulsed neutron data and selecting a hypothetical matrix model that most closely correlates with measured pulsed neutron data.

18. The apparatus of claim 11, wherein the generated shale model represents an earth formation comprised of a first non-zero percentage of shale that excludes sand components.

* * * * *